(12) United States Patent  
Kojima et al.

(10) Patent No.: US 12,332,936 B2  
(45) Date of Patent: Jun. 17, 2025

(54) IMAGE PROCESSING APPARATUS, IMAGE PROCESSING METHOD, AND NON-TRANSITORY STORAGE MEDIUM

(71) Applicant: NEC Corporation, Tokyo (JP)

(72) Inventors: Kazufumi Kojima, Tokyo (JP); Masahiro Tani, Tokyo (JP); Keisuke Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/141,148

(22) Filed: Apr. 28, 2023

(65) Prior Publication Data

US 2023/0367806 A1 Nov. 16, 2023

(30) Foreign Application Priority Data

May 11, 2022 (JP) ................. 2022-078085

(51) Int. Cl.
*G06F 16/583* (2019.01)
*G06T 7/11* (2017.01)
*G06T 7/62* (2017.01)
*G06T 7/70* (2017.01)
*G06V 10/44* (2022.01)
*G06V 10/74* (2022.01)

(52) U.S. Cl.
CPC ............. *G06F 16/583* (2019.01); *G06T 7/11* (2017.01); *G06T 7/62* (2017.01); *G06T 7/70* (2017.01); *G06V 10/44* (2022.01); *G06V 10/761* (2022.01); *G06V 2201/07* (2022.01)

(58) Field of Classification Search
CPC . G06F 16/583; G06T 7/62; G06T 7/11; G06T 7/70; G06V 10/761; G06V 10/44; G06V 2201/07

USPC ......................................... 707/758
See application file for complete search history.

(56) References Cited

U.S. PATENT DOCUMENTS

2016/0342859 A1\* 11/2016 Rajaram .................. G06T 7/11
2021/0224312 A1\* 7/2021 Harikumar ............ G06F 16/532
2021/0357656 A1\* 11/2021 Ren ........................ H04N 7/183

OTHER PUBLICATIONS

Bingyi Cao, two others, "Unifying Deep Local and Global Features for Image Search", [online], [searched on Apr. 4, 2022], the Internet <URL:https://www.ecva.net/papers/eccv_2020/papers_ECCV/papers/123650715.pdf>.
Stephen Hausler, four others, "Patch-NetVLAD: Multi-Scale Fusion of Locally-Global Descriptors for Place Recognition", [online], [searched on Apr. 4, 2022], the Internet <URL:https://openaccess.thecvf.com/content/CVPR2021/papers/Hausler_Patch-NetVLAD_Multi-Scale_Fusion_of_Locally-Global_Descriptors_for_Place_Recognition_CVPR_2021_paper.pdf>.

\* cited by examiner

*Primary Examiner* — Cam Linh T Nguyen

(57) ABSTRACT

To reduce a decrease in search accuracy in a technique for comparing feature values acquired by collecting a local feature value by patch unit, the present invention provides an image processing apparatus 10 including: an image processing unit 11 that detects an object region occupied by an object in an image; a patch size decision unit 12 that decides a patch size, based on a size of the object region; a patch unit feature value-computation unit 13 that sets a plurality of patches having the patch size described above in the object region, and computes a patch unit feature value acquired by collecting a local feature value in a patch for each patch; and a search unit 14 that searches for an image similar to a query image from among a plurality of reference images by using the patch unit feature value.

4 Claims, 9 Drawing Sheets

FIG. 4

REFERENCE IMAGE

| REFERENCE IMAGE IDENTIFICATION INFORMATION | POSITION INFORMATION | PATCH UNIT FEATURE VALUE | | |
|---|---|---|---|---|
| | | OBJECT 1 | OBJECT 2 | ... |
| R1313817 | (..., ...) | *, | ,** | ... |
| ... | ... | ... | ... | ... |

FIG. 8

REFERENCE IMAGE

| REFERENCE IMAGE IDENTIFICATION INFORMATION | POSITION INFORMATION | OBJECT 1 | | .... |
| --- | --- | --- | --- | --- |
| | | OBJECT REGION UNIT FEATURE VALUE | PATCH UNIT FEATURE VALUE | |
| R1313817 | (....,....) | * | *,***,.... | .... |
| .... | .... | .... | .... | .... |

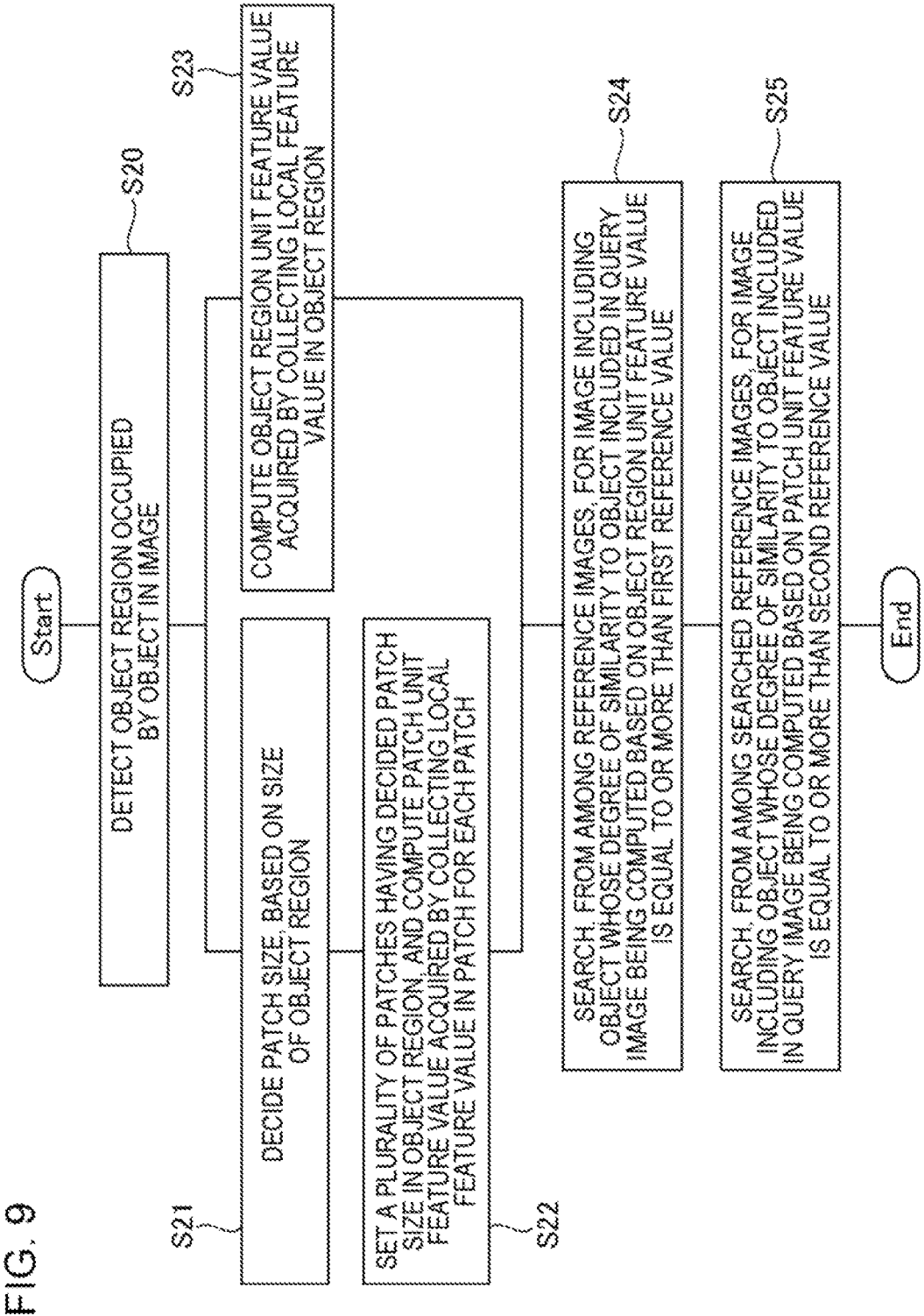

IMAGE PROCESSING APPARATUS, IMAGE PROCESSING METHOD, AND NON-TRANSITORY STORAGE MEDIUM

This application is based upon and claims the benefit of priority from Japanese patent application No. 2022-78085, filed on May 11, 2022, the disclosure of which is incorporated herein in its entirety by reference.

TECHNICAL FIELD

The present invention relates to an image processing apparatus, an image processing method, and a program.

BACKGROUND ART

A technique for searching, from among reference images, for an image in which the same subject (subject whose degree of similarity is equal to or more than a reference value) as a subject captured in a query image is captured has been studied. The related techniques are disclosed in NPL 1 (Bingyi Cao, two others, "Unifying Deep Local and Global Features for Image Search", [online], [searched on Apr. 4, 2022], the Internet <URL: https://www.ecva.net/papers/eccv_2020/papers_ECCV/papers/123650715.pdf>) and NPL 2 (Stephen Hausler, four others, "Patch-NetVLAD: Multi-Scale Fusion of Locally-Global Descriptors for Place Recognition", [online], [searched on Apr. 4, 2022], the Internet <URL: https://openaccess.thecvf.com/content/CVPR2021/papers/Hausler_Patch-NetVLAD_Multi-Scale Fusion_of_Locally-Global_Descriptors_for_Place_Recognition_CVPR_2021_paper.pdf>).

NPL 1 discloses a technique for narrowing down images similar to a query image by using a feature value of an entire image, and then searching for an image similar to the query image from the images by using a local feature value being a feature value in a pixel unit.

NPL 2 discloses a technique for setting a plurality of patches having a predetermined size being predetermined in an image, and collecting, by patch unit, a local feature value being a feature value in a pixel unit.

DISCLOSURE OF THE INVENTION

As in the technique disclosed in NPL 1, when local feature values being feature values in a pixel unit are compared, there is a problem that a processing load on a computer increases, and a search speed becomes slower. The problem described above can be reduced by comparing feature values acquired by collecting a local feature value by patch unit by using the technique disclosed in NPL 2.

However, the technique disclosed in NPL 2 has a problem as follows. Even when the same subject as a subject captured in a query image is captured in a reference image, a situation where a size of the subject in the query image and a size of the subject in the reference image are different from each other may occur. Nevertheless, when a patch having a predetermined size being predetermined is uniformly set for the query image and the reference image, sizes (proportions of occupancy in the subject) of a part of the subject included in one patch may be different from each other. In a case of an image in which a subject is captured in a relatively small size, for example, a situation where half or more of the subject is included in one patch may occur, and, in a case of an image in which a subject is captured in a relatively large size, for example, a situation where approximately 1/10 of the subject is included in one patch may occur. In this case, although a reference image in which the same subject as a subject captured in a query image is captured, an inconvenience that a degree of similarity between feature values acquired by collecting a local feature value by patch unit decreases, and the reference image is not searched as an image in which the same subject as the subject captured in the query image is captured may occur.

One example of an object of the present invention is, in view of the problem described above, to provide an image processing apparatus, an image processing method, and a program that solve a challenge to reduce a decrease in search accuracy in a technique for comparing feature values acquired by collecting a local feature value by patch unit.

One aspect of the present invention provides an image processing apparatus including:
   an image processing unit that detects an object region occupied by an object in an image;
   a patch size decision unit that decides a patch size, based on a size of the object region;
   a patch unit feature value-computation unit that sets a plurality of patches having the patch size in the object region, and computes a patch unit feature value acquired by collecting a local feature value in a patch for each patch; and
   a search unit that searches for an image similar to a query image from among a plurality of reference images by using the patch unit feature value.

One aspect of the present invention provides an image processing method including, by a computer:
   detecting an object region occupied by an object in an image;
   deciding a patch size, based on a size of the object region;
   setting a plurality of patches having the patch size in the object region, and computing a patch unit feature value acquired by collecting a local feature value in a patch for each patch; and
   searching for an image similar to a query image from among a plurality of reference images by using the patch unit feature value.

One aspect of the present invention provides a program causing a computer to function as:
   an image processing unit that detects an object region occupied by an object in an image;
   a patch size decision unit that decides a patch size, based on a size of the object region;
   a patch unit feature value-computation unit that sets a plurality of patches having the patch size in the object region, and computes a patch unit feature value acquired by collecting a local feature value in a patch for each patch; and
   a search unit that searches for an image similar to a query image from among a plurality of reference images by using the patch unit feature value.

According to one aspect of the present invention, an image processing apparatus, an image processing method, and a program that solve a challenge to reduce a decrease in search accuracy in a technique for comparing feature values acquired by collecting a local feature value by patch unit is achieved.

BRIEF DESCRIPTION OF THE DRAWINGS

The above-described object, the other objects, features, and advantages will become more apparent from suitable example embodiment described below and the following accompanying drawings.

FIG. 4 is a diagram schematically illustrating one example of information processed by the image processing apparatus.

FIG. 8 is a diagram schematically illustrating one example of information processed by the image processing apparatus.

FIG. 9 is a flowchart illustrating one example of a flow of processing of the image processing apparatus.

DESCRIPTION OF EMBODIMENTS

Hereinafter, example embodiments of the present invention will be described with reference to the drawings. Note that, in all of the drawings, a similar component has a similar reference sign, and description thereof will be appropriately omitted.

First Example Embodiment

Figure 1:
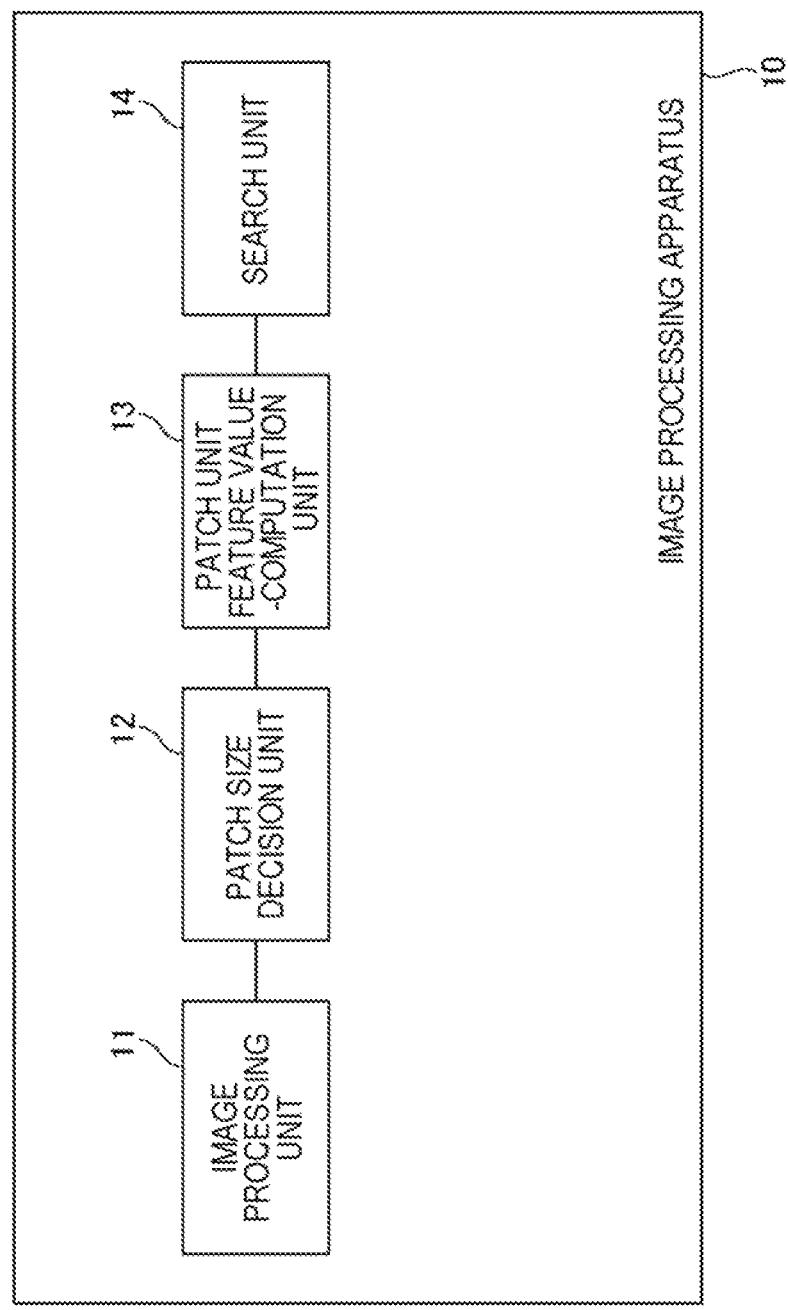
FIG. 1 is a diagram illustrating one example of a functional block diagram of an image processing apparatus.

FIG. 1 is a functional block diagram illustrating an overview of an image processing apparatus 10 according to a first example embodiment. The image processing apparatus 10 includes an image processing unit 11, a patch size decision unit 12, a patch unit feature value-computation unit 13, and a search unit 14.

The image processing unit 11 detects an object region occupied by an object in an image. The patch size decision unit 12 decides a patch size, based on a size of the object region. The patch unit feature value-computation unit 13 sets a plurality of patches having the patch size described above in the object region, and computes a patch unit feature value acquired by collecting a local feature value in the patch for each of the patches. The search unit 14 searches for an image similar to a query image from among a plurality of reference images by using the patch unit feature value.

The image processing apparatus 10 having such a configuration solves a challenge to reduce a decrease in search accuracy in a technique for comparing feature values acquired by collecting a local feature value by patch unit.

Second Example Embodiment

"Outline"

An image processing apparatus 10 according to a second example embodiment is acquired by further embodying the image processing apparatus 10 according to the first example embodiment. The image processing apparatus 10 according to the present example embodiment detects an object region occupied by an object (subject) in an image, then sets a plurality of patches in the object region, and computes a patch unit feature value acquired by collecting a local feature value in the patch for each of the patches. Then, the image processing apparatus 10 searches for an image similar to a query image from among a plurality of reference images by using the computed patch unit feature value. Note that, the image processing apparatus 10 adjusts a patch size for each image. The image processing apparatus 10 increases a patch size of an object captured in a large size, and reduces a patch size of an object captured in a small size.

Figure 2:
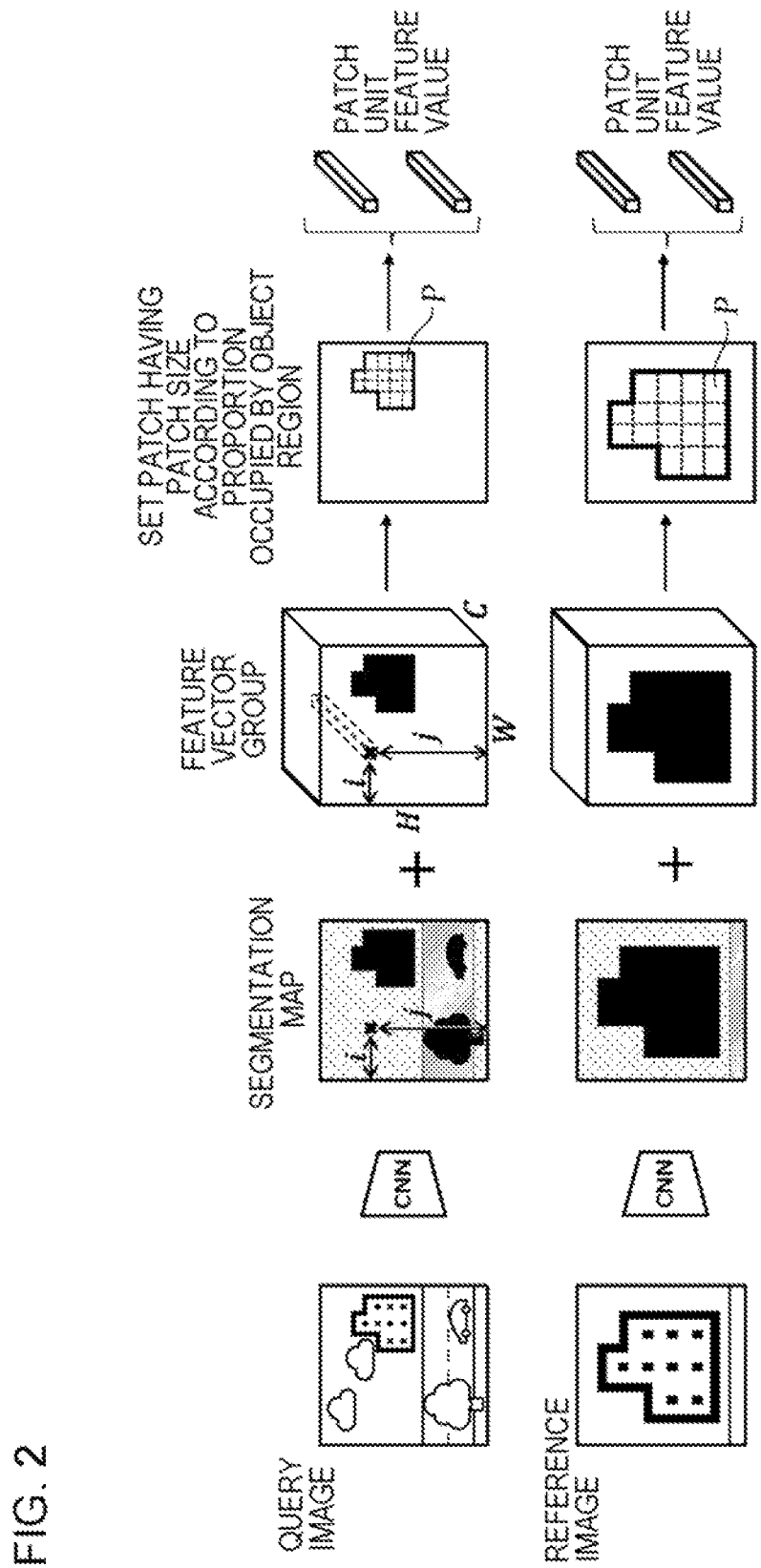
FIG. 2 is a diagram illustrating one example of processing of the image processing apparatus.

By using FIG. 2, one example of the processing will be described. FIG. 2 illustrates a query image and a reference image in which the same building (object) is captured. The building is captured in a larger size in the reference image.

The image processing apparatus 10 generates a segmentation map and a feature vector group by an estimation model such as, for example, a convolutional neural network (CNN), and then sets a plurality of patches P in a detected object region. As described above, the image processing apparatus 10 increases a patch size of an object captured in a large size, and reduces a patch size of an object captured in a small size. Thus, a patch size of the patch P set in the object region detected from the reference image is larger than a patch size of the patch P set in the object region detected from the query image. Then, a proportion at which one patch P occupies the object region detected from the reference image is equal to a proportion at which one patch P occupies the object region detected from the query image. After the image processing apparatus 10 sets the patch P as described above, the image processing apparatus 10 computes a patch unit feature value acquired by collecting a local feature value in the patch P for each of the patches P.

In this way, the image processing apparatus 10 that adjusts a patch size for each image can set equal proportions at which one patch P occupies an object region in which the same object is captured even when the same object is captured in sizes different from each other in a plurality of images. As a result, the same object being captured in the plurality of images can be accurately determined. Further, by comparing patch unit feature values acquired by a plurality of local feature values instead of comparing local feature values, a processing load on a computer is reduced, and a search speed becomes faster.

Next, a configuration of the image processing apparatus 10 will be described in more detail.

"Hardware Configuration"

Next, one example of a hardware configuration of the image processing apparatus 10 will be described. Each functional unit of the image processing apparatus 10 is achieved by any combination of hardware and software concentrating on as a central processing unit (CPU) of any computer, a memory, a program loaded into the memory, a storage unit such as a hard disc that stores the program (that can also store a program downloaded from a storage medium such as a compact disc (CD), a server on the Internet, and the like in addition to a program previously stored at a stage of shipping of an apparatus), and a network connection interface. Then, various modification examples of an achievement method and an apparatus thereof are understood by a person skilled in the art.

Figure 3:
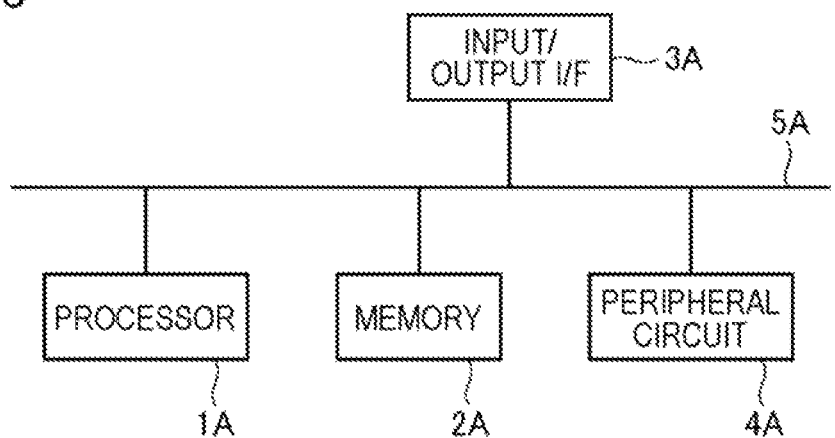
FIG. 3 is a diagram illustrating one example of a hardware configuration example of the image processing apparatus.

FIG. 3 is a block diagram illustrating a hardware configuration of the image processing apparatus 10. As illustrated in FIG. 3, the image processing apparatus 10 includes a processor 1A, a memory 2A, an input/output interface 3A, a peripheral circuit 4A, and a bus 5A. Various modules are included in the peripheral circuit 4A. The image processing apparatus 10 may not include the peripheral circuit 4A. Note that the image processing apparatus 10 may be formed of a plurality of apparatuses being separated physically and/or logically. In this case, each of the plurality of apparatuses can include the hardware configuration described above.

The bus 5A is a data transmission path for the processor 1A, the memory 2A, the peripheral circuit 4A, and the input/output interface 3A to transmit and receive data to and from one another. The processor 1A is an arithmetic processing apparatus such as a CPU and a graphics processing unit (GPU), for example. The memory 2A is a memory such as a random access memory (RAM) and a read only memory (ROM), for example. The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can output an instruction to each of modules, and perform an arithmetic operation, based on an arithmetic result of the modules.

"Functional Configuration"

Next, a functional configuration of the image processing apparatus 10 according to the second example embodiment will be described in detail. FIG. 1 is one example of a functional block diagram of the image processing apparatus 10. As illustrated, the image processing apparatus 10 includes an image processing unit 11, a patch size decision unit 12, a patch unit feature value-computation unit 13, and a search unit 14. The image processing apparatus 10 may further include a storage unit that stores a plurality of reference images. Note that, an external apparatus separated physically and/or logically from the image processing apparatus 10 may include the storage unit described above. In this case, the image processing apparatus 10 and the external apparatus are communicably connected to each other.

The image processing unit 11 performs feature value extraction processing and object region detection processing on a query image. Note that, the processing may be performed in advance on a reference image stored in the storage unit, and a result of the processing may be stored in association with each reference image in the storage unit. In addition, the image processing unit 11 may perform the processing each time on a reference image determined as a target to be compared with a query image.

The feature value extraction processing is processing of extracting a feature value of an image. For example, when an image is input to a learned estimation model, a feature value of the image is extracted, and data about a feature vector group are created. The data about the feature vector group indicates a feature value (local feature value) of each pixel. In the example illustrated in FIG. 2, a feature value of each pixel is indicated by C-dimensional data. The estimation model is, for example, a CNN, which is not limited thereto. Generation of data about a feature vector group can be achieved by using various conventional techniques.

The object region detection processing is processing of detecting an object region occupied by an object in an image. The processing is not particularly limited, and can be achieved by using various conventional techniques.

As one example, in the object region detection processing, an object region may be detected by estimating a cluster to which each pixel belongs. In the processing, an image is divided into a plurality of clusters. Each of the clusters is associated with each of kinds of subjects. For example, one cluster associated with a road is present, and one cluster associated with a plant is present. The processing of dividing an image into a plurality of clusters is equal to processing of dividing an image into a plurality of areas for each of a plurality of objects. As illustrated in FIG. 2, when an image is input to a learned estimation model, a segmentation map is created. The segmentation map indicates a result of dividing the image described above into a plurality of clusters, i.e., a cluster to which each pixel belongs.

In the present example embodiment, a segmentation map is created by using a known segmentation technique. As the known segmentation technique, for example, semantic segmentation, instance segmentation, a panoptic segmentation map, and the like are exemplified. In the present example embodiment, for example, when a certain pixel is considered, a segmentation map is created by using a technique of unsupervised segmentation using a fact that more adjacent pixels have a stronger correlation and farther pixels have a weaker correlation.

In addition, another object detection technique such as a regional CNN (R-CNN), you only look once (YOLO), a single shot multibox detector (SDD), and end-to-end object detection with transformers (DETR) may be used.

The patch size decision unit 12 decides a patch size, based on a size of the object region detected by the image processing unit 11.

The patch size decision unit 12 decides a larger patch size as a size of the object region is larger. As one example, the patch size decision unit 12 can decide a patch size, based on a proportion of a size of an object region to a size of an entire image. For example, a reference value of a patch size may be set in advance. Then, the patch size decision unit 12 can decide, as a patch size, a product of the reference value and the proportion described above. A size of an entire image and a size of an object region can be indicated by a pixel number, for example.

The patch unit feature value-computation unit 13 sets, in the object region, a plurality of patches having the patch size decided by the patch size decision unit 12. Then, the patch unit feature value-computation unit 13 computes a patch unit feature value acquired by collecting a local feature value (a feature value of a pixel included in the patch) in the patch for each of the patches.

First, the processing of setting a plurality of patches in an object region will be described.

The patch unit feature value-computation unit 13 sets a plurality of patches in each object region, based on a predetermined rule. There are various ways of setting a plurality of patches. For example, as in the example in FIG. 2, a plurality of patches may be set in such a way that adjacent patches do not overlap each other and are aligned without a gap. In addition, although not illustrated, a plurality of patches may be set in such a way that adjacent patches may be aligned with a predetermined gap. In addition, although not illustrated, a plurality of patches may be set in such a way that adjacent patches overlap each other. The exemplification herein is merely one example, and various techniques can be adopted as a way of setting a plurality of patches.

Next, the processing of computing a patch unit feature value acquired by collecting a local feature value in a patch for each patch will be described.

Each patch includes a plurality of pixels. In the processing, a feature value (local feature value) of a plurality of pixels included in each patch is collected, and a patch unit feature value is computed. As a means for collecting a feature value (local feature value) of a plurality of pixels, for example, the technique disclosed in NPL 2 may be used, or another means may be used. A calculated patch unit feature value may be managed in association with any (for example: a pixel located at the center) of a plurality of pixels included in each patch. In addition, patch identification information that identifies a plurality of patches from each other may be generated, and a patch unit feature value may be managed in association with the patch identification information.

The search unit 14 searches for an image similar to a query image, specifically, an image in which the same object as an object captured in the query image is captured, from among a plurality of reference images by using the patch unit feature value.

In the processing, the search unit 14 computes a degree of similarity between the query image and each of a plurality of reference images (see FIG. 4) stored in the storage unit. Then, a reference image whose degree of similarity is equal to or more than a threshold value is determined as the image similar to the query image.

The search unit 14 uses a patch unit feature value for computing a degree of similarity. The search unit 14 computes a degree of similarity between a plurality of patch unit feature values computed from a query image and a plurality of patch unit feature values computed from a reference image, and associates a pair whose computed degree of similarity satisfies a predetermined condition (for example: equal to or more than a reference) with each other. Then, the search unit 14 computes a degree of similarity between the query image and the reference image, based on the number of pairs associated with each other. Note that, a method for computing a degree of similarity between patch unit feature values, a method for deciding a pair associated with each other, based on a computed degree of similarity, and a method for computing a degree of similarity between two images, based on the number of pairs associated with each other can be achieved by adopting various conventional techniques.

In this way, the search unit 14 can search for an image similar to a query image from among a plurality of reference images, based on a degree of similarity between a patch unit feature value of the query image (a patch unit feature value computed from the query image) and a patch unit feature value of the reference image (a patch unit feature value computed from the reference image).

Note that, a patch size used for computing a patch unit feature value of a query image is decided according to a size of an object region in the query image. Then, a patch size used for computing a patch unit feature value of a reference image is decided according to a size of an object region in the reference image. In other words, the patch sizes are decided independent of each other. A patch size used for computing a patch unit feature value of a query image and a patch size used for computing a patch unit feature value of a reference image may be the same or may be different. When a size of an object region in a query image and a size of an object region in a reference image are the same, a patch size used for computing a patch unit feature value of the query image and a patch size used for computing a patch unit feature value of the reference image are the same. On the other hand, when a size of an object region in a query image and a size of an object region in a reference image are different from each other, a patch size used for computing a patch unit feature value of the query image and a patch size used for computing a patch unit feature value of the reference image are different from each other.

Note that, as illustrated in FIG. 4, a plurality of reference images may be associated with position information (such as latitude/longitude information) indicating a captured position. In this case, a position indicated by position information about a reference image similar to a query image can be estimated as a captured position of the query image. Note that, in this way, when search processing is used for determining a captured position of a query image, an object may preferably be a landmark without having a place moved, such as a building.

Figure 5:
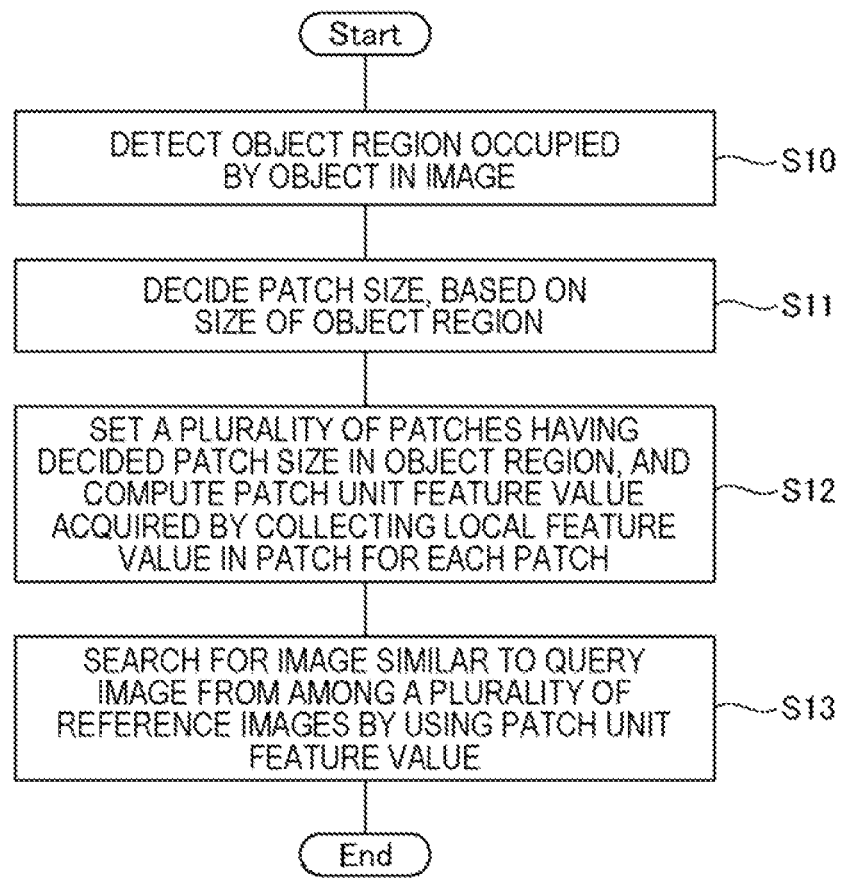
FIG. 5 is a flowchart illustrating one example of a flow of processing of the image processing apparatus.

Next, one example of a flow of processing of the image processing apparatus 10 will be described by using a flowchart in FIG. 5.

First, the image processing apparatus 10 analyzes a query image, and detects an object region occupied by an object in the image (S10). Note that, in S10, the image processing apparatus 10 may further analyze the query image, and generate data about a feature vector group indicating a feature value (local feature value) of each pixel. The generation of the data about the feature vector group may be performed at another timing before S12.

Next, the image processing apparatus 10 decides a patch size, based on a size of the object region detected in S10 (S11). Next, the image processing apparatus 10 sets, in the object region, a plurality of patches having the patch size decided in S11, and computes a patch unit feature value acquired by collecting a local feature value in the patch for each of the patches (S12).

Next, the image processing apparatus 10 searches for an image similar to the query image from among a plurality of reference images by using the patch unit feature value computed in S12 (S13).

Advantageous Effect

The image processing apparatus 10 according to the second example embodiment adjusts a patch size for each image in a technique for comparing feature values acquired by collecting a local feature value by patch unit. The image processing apparatus 10 increases a patch size of an object captured in a large size, and reduces a patch size of an object captured in a small size. For example, the image processing apparatus 10 can decide a patch size, based on a proportion of a size of an object region to a size of an entire image. In a case of such a configuration, a proportion at which one patch occupies an object region of a certain object detected from a reference image can be set equal to a proportion at which one patch occupies an object region of the same object detected from a query image. As a result, even when the same object is captured in sizes different from each other in a plurality of images, the same object being captured in the plurality of images can be accurately determined by a comparison between patch unit feature values acquired by collecting a local feature value by patch unit. Further, by comparing patch unit feature values acquired by a plurality of local feature values instead of comparing local feature values, a processing load on a computer is reduced, and a search speed becomes faster.

Third Example Embodiment

An image processing apparatus 10 according to a third example embodiment adjusts a patch size for each object region (each object) when a plurality of object regions are detected from one image. When sizes of the plurality of detected object regions are different from each other, patch sizes different from each other are decided. When a plurality of objects are captured in one image, such an image processing apparatus 10 according to the present example embodiment can decide, for each of the objects, an appropriate patch size according to a size of each of the objects in the image. Details will be described below.

When a plurality of objects are present in one image, an image processing unit 11 detects an object region for each of the objects.

When a plurality of the object regions are detected from one image, a patch size decision unit 12 decides, for each of the object regions, a patch size according to a size of each of the object regions.

When the plurality of object regions are detected from one image, a patch unit feature value-computation unit 13 sets, in each of the object regions, a plurality of patches having the patch size decided in association with each of the object regions. Then, the patch unit feature value-computation unit 13 computes a patch unit feature value acquired by collecting a local feature value in the patch for each of the patches.

When a plurality of objects are included in a query image, a search unit 14 searches, for each of the objects, for a reference image in which the object is captured. For example, when a first object and a second object are included in a query image, the search unit 14 searches for a reference image in which the first object is captured, based on a patch unit feature value being computed based on a patch set in an object region of the first object. Further, the search unit 14 searches for a reference image in which the second object is captured, based on a patch unit feature value being computed based on a patch set in an object region of the second object. In addition, the search unit 14 may search for a reference image in which the first object and the second object are captured, based on a patch unit feature value being computed based on a patch set in an object region of the first object and a patch unit feature value being computed based on a patch set in an object region of the second object.

Another configuration of the image processing apparatus 10 according to the present example embodiment is similar to the configuration of the image processing apparatus 10 according to the first and second example embodiments.

The image processing apparatus 10 according to the present example embodiment can achieve an advantageous effect similar to that of the image processing apparatus 10 according to the first and second example embodiments.

Further, when a plurality of object regions are detected from one image, the image processing apparatus 10 according to the present example embodiment can decide, for each object region (each object), an appropriate patch size according to a size of each of the object regions. As a result, the same object being captured in the plurality of images can be more accurately determined.

Fourth Example Embodiment

An image processing apparatus 10 according to a fourth example embodiment can search for a reference image by characteristic processing when a plurality of objects are included in a query image. Details will be described below.

A search unit 14 searches for a reference image by characteristic processing as follows when a plurality of objects are included in a query image.

As illustrated in FIG. 4, it is assumed that position information indicating a captured position is associated with each of a plurality of reference images as a premise of the processing.

A plurality of objects being captured in one query image conceivably indicates a relatively close distance between the plurality of objects. The search unit 14 can perform search processing in consideration of this point.

First, the search unit 14 searches for a reference image in which all (in addition, may be a predetermined number or more, or a predetermined proportion or more) of a plurality of objects captured in a query image are captured from among a plurality of reference images. When a reference image in which all (in addition, may be a predetermined number or more, or a predetermined proportion or more) of the plurality of objects are captured is searched, the search unit 14 may end the search. in this case, the query image is estimated to be captured in a position indicated by position information associated with the searched reference image.

On the other hand, when a reference image in which all (in addition, may be a predetermined number or more, or a predetermined proportion or more) of the plurality of objects are captured is not found, the search unit 14 searches for a reference image in which any of the plurality of objects is captured. Then, the search unit 14 further narrows down reference images included in the search result by using position information associated with each reference image.

First, a plurality of reference images determined that a first object among a plurality of objects is captured may include a reference image in which the first object is actually captured, and a reference image in which the first object is not captured but an object similar to the first object is captured.

Similarly, a plurality of reference images determined that a second object among a plurality of objects is captured may include a reference image in which the second object is actually captured, and a reference image in which the second object is not captured but an object similar to the second object is captured.

The reference image in which the first object is not captured but an object similar to the first object is captured, and the reference image in which the second object is not captured but an object similar to the second object is captured are preferably excluded from a search result.

Thus, the search unit 14 removes, from among a plurality of reference images determined that the first object is captured, a reference image in which a position indicated by associated position information is located away by equal to or more than a predetermined threshold value from a position indicated by position information associated with any of a plurality of reference images determined that the second object is captured. By the processing, a reference image in absence of a reference image in which the second object captured near a captured position of each reference image is captured can be removed from a plurality of reference images determined that the first object is captured.

Similarly, the search unit 14 removes, from among a plurality of reference images determined that the second object is captured, a reference image in which a position indicated by associated position information is located away by equal to or more than a predetermined threshold value from a position indicated by position information associated with any of a plurality of reference images determined that the first object is captured. By the processing, a reference image in absence of a reference image in which the first object captured near a captured position of each reference image is captured can be removed from a plurality of reference images determined that the second object is captured.

By such processing, for example, the search unit 14 can remove, from a search result, the reference image in which the first object is not captured but an object similar to the first object is captured, and the reference image in which the second object is not captured but an object similar to the second object is captured.

Note that, the example in which a plurality of objects are two objects of the first object and the second object is described herein, but search results can also be further narrowed down by similar processing when a plurality of objects are three or more.

Another configuration of the image processing apparatus 10 according to the present example embodiment is similar to the configuration of the image processing apparatus 10 according to the first to third example embodiments.

The image processing apparatus 10 according to the present example embodiment can achieve an advantageous effect similar to that of the image processing apparatus 10 according to the first to third example embodiments.

Further, when a plurality of objects are included in one query image, the image processing apparatus 10 according to the present example embodiment can search for a reference image in which all (in addition, may be a predetermined number or more, or a predetermined proportion or more) of the plurality of objects are captured. Then, when a reference image in which all (in addition, may be a predetermined number or more, or a predetermined proportion or more) of the plurality of objects are captured is not searched, a reference image in which each of the plurality of objects is captured can be searched, and search results can be narrowed down based on position information associated with the reference image. Such an image processing apparatus 10 according to the present example embodiment can narrow down search results with high accuracy.

Fifth Example Embodiment

An image processing apparatus 10 according to a fifth example embodiment decides a plurality of patch sizes for each object region, and computes a patch unit feature value by setting patches having the plurality of patch sizes for each object region.

As described in the example embodiments described above, by setting a patch size according to a size of each object region for each object region, a proportion at which one patch occupies an object region of a certain object detected from a reference image can be set equal to a proportion at which one patch occupies an object region of the same object detected from a query image. Furthermore, in the present example embodiment, by deciding a plurality of patch sizes, and computing a patch unit feature value by setting patches having the plurality of patch sizes, a probability that a proportion at which one patch occupies an object region of a certain object detected from a reference image is equal to a proportion at which one patch occupies an object region of the same object detected from a query image is improved. Details will be described below.

A patch size decision unit 12 decides a patch size, based on a size of an object region detected by an image processing unit 11. The patch size decision unit 12 decides a plurality of patch sizes in association with one object region. For example, the patch size decision unit 12 can decide, as a patch size, a product of a reference value and a proportion of a size of an object region to a size of an entire image, but a plurality of the reference values are set in advance. Then, the patch size decision unit 12 decides, as a patch size, a product of each of the reference values and the proportion described above.

A patch unit feature value-computation unit 13 sets a plurality of patches having the plurality of patch sizes in the object region, and computes a patch unit feature value acquired by collecting a local feature value in the patch for each of the patches. Note that, the plurality of patches having the patch sizes different from each other may be set in such a way as to overlap each other. For example, a patch having a first patch size may include a patch having a second patch size, or at least a part of a patch having the first patch size and at least a part of a patch having the second patch size may overlap each other.

Another configuration of the image processing apparatus 10 according to the present example embodiment is similar to the configuration of the image processing apparatus 10 according to the first to fourth example embodiments.

The image processing apparatus 10 according to the present example embodiment can achieve an advantageous effect similar to that of the image processing apparatus 10 according to the first to fourth example embodiments.

Further, by deciding a plurality of patch sizes in association with one object region, and computing a patch unit feature value by setting patches having the plurality of patch sizes, the image processing apparatus 10 according to the present example embodiment can improve a probability that a proportion at which one patch occupies an object region of a certain object detected from a reference image is equal to a proportion at which one patch occupies an object region of the same object detected from a query image. As a result, the same object being captured in the plurality of images can be more accurately determined.

Sixth Example Embodiment

Figure 6:
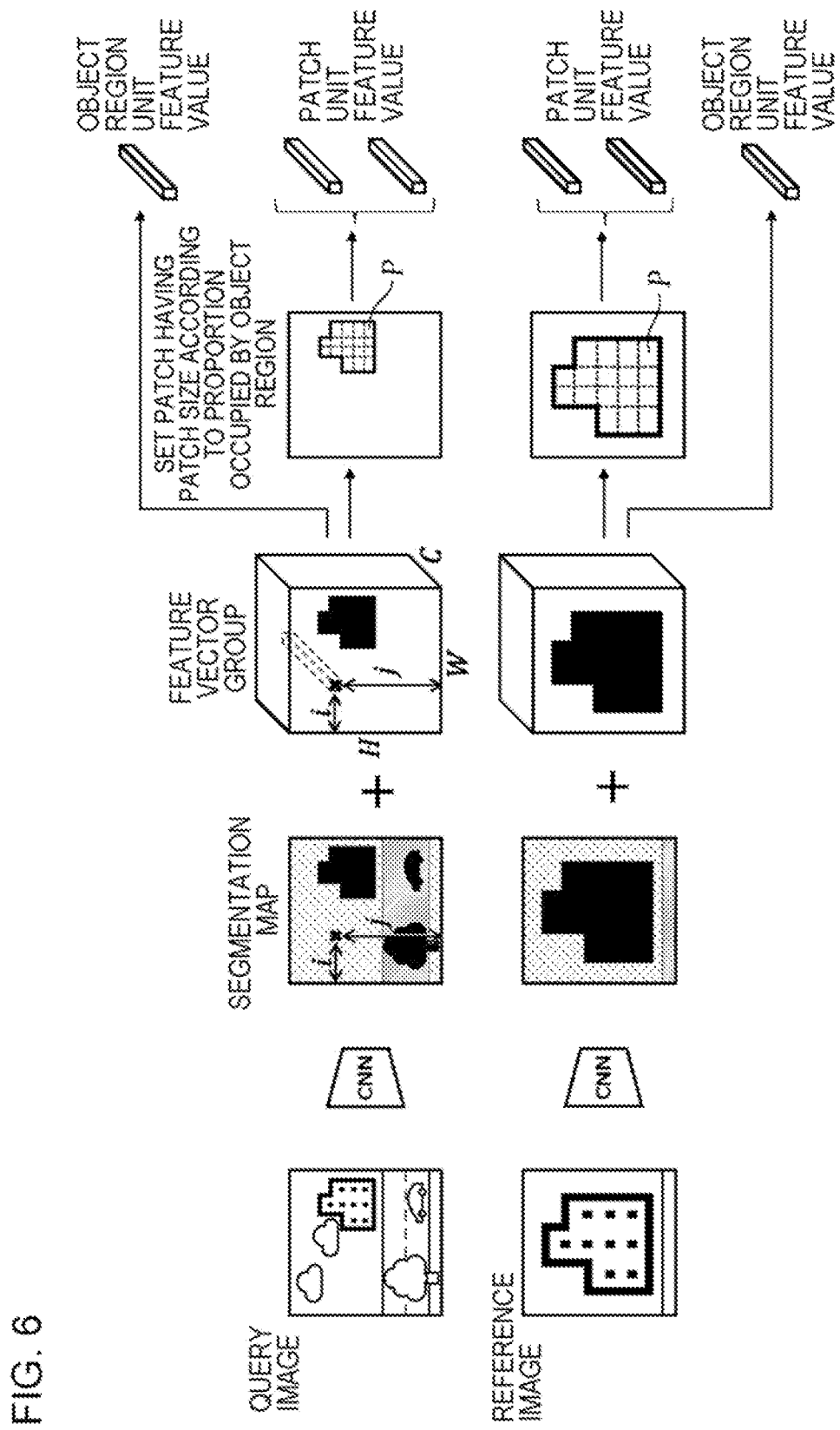
FIG. 6 is a diagram illustrating another example of processing of the image processing apparatus.

As illustrated in FIG. 6, an image processing apparatus 10 according to a sixth example embodiment computes an object region unit feature value acquired by collecting a local feature value in an object region in addition to a patch unit feature value acquired by collecting a local feature value in a patch, and searches for a reference image similar to a query image by using the feature values. Details will be described below.

Figure 7:
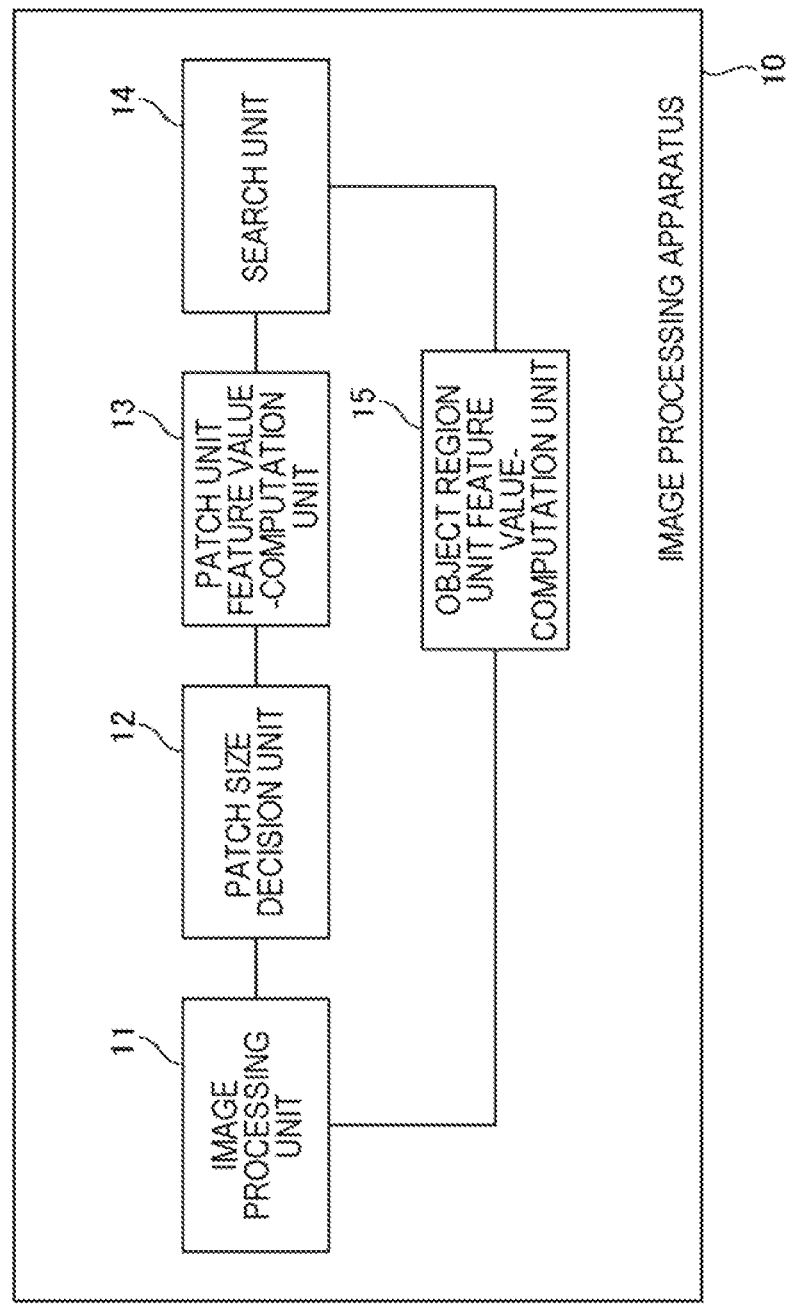
FIG. 7 is a diagram illustrating one example of a functional block diagram of the image processing apparatus.

FIG. 7 is one example of a functional block diagram of the image processing apparatus 10. As illustrated, the image processing apparatus 10 includes an image processing unit 11, a patch size decision unit 12, a patch unit feature value-computation unit 13, a search unit 14, and an object region unit feature value-computation unit 15. The image processing apparatus 10 may further include a storage unit that stores a plurality of reference images. Note that, an external apparatus separated physically and/or logically from the image processing apparatus 10 may include the storage unit described above. In this case, the image processing apparatus 10 and the external apparatus are communicably connected to each other.

The object region unit feature value-computation unit 15 computes an object region unit feature value acquired by collecting a local feature value (a feature value of a pixel included in an object region) in an object region. When a plurality of object regions are detected in an image, the object region unit feature value-computation unit 15 computes an object region unit feature value for each of the object regions. As a means for collecting a feature value of a plurality of pixels, for example, the technique disclosed in NPL 2 may be used, or another means may be used.

The search unit 14 searches for an image similar to a query image, specifically, an image in which the same object as an object captured in the query image is captured, from among a plurality of reference images by using a patch unit feature value and the object region unit feature value.

Specifically, first, the search unit 14 searches, from among reference images, for an image including an object whose "degree of similarity to an object included in a query image" being computed based on an object region unit feature value is equal to or more than a first reference value. Next, the search unit 14 searches, from among the searched reference images, for an image including an object whose "degree of similarity to an object included in a query image" being computed based on a patch unit feature value is equal to or more than a second reference value.

In other words, first, the search unit 14 roughly narrows down reference images by using an object region unit feature value, and then searches, by using a patch unit feature value, for a desired reference image from among the reference images being roughly narrowed down. The first reference value and the second reference value may be the same or may be different.

Note that, in the present example embodiment, as illustrated in FIG. 8, an object region unit feature value and a patch unit feature value are associated with each of a plurality of reference images stored in the storage unit.

Next, one example of a flow of processing of the image processing apparatus 10 will be described by using a flowchart in FIG. 9.

First, the image processing apparatus 10 analyzes a query image, and detects an object region occupied by an object in the image (S20). Note that, in S20, the image processing apparatus 10 may further analyze the query image, and generate data about a feature vector group indicating a feature value (local feature value) of each pixel. The generation of the data about the feature vector group may be performed at another timing before S22 and S23.

Next, the image processing apparatus 10 decides a patch size, based on a size of the object region detected in S20 (S21). Next, the image processing apparatus 10 sets, in the object region, a plurality of patches having the patch size decided in S21, and computes a patch unit feature value acquired by collecting a local feature value in the patch for each of the patches (S22).

Further, the image processing apparatus 10 computes an object region unit feature value acquired by collecting a local feature value in the object region (S23).

Note that, S21 and S22, and S23 may be performed simultaneously as illustrated, or may be performed successively.

Next, the image processing apparatus 10 searches, from among reference images, for an image including an object whose "degree of similarity to an object included in a query image" being computed based on the object region unit feature value computed in S23 is equal to or more than a first reference value (S24).

Next, the image processing apparatus 10 searches, from among the reference images searched in S24, for an image including an object whose "degree of similarity to an object included in a query image" being computed based on the patch unit feature value computed in S22 is equal to or more than a second reference value (S25).

Another configuration of the image processing apparatus 10 according to the present example embodiment is similar to the configuration of the image processing apparatus 10 according to the first to fifth example embodiments.

The image processing apparatus 10 according to the present example embodiment can achieve an advantageous effect similar to that of the image processing apparatus 10 according to the first to fifth example embodiments.

Further, the image processing apparatus 10 according to the present example embodiment can search for a reference image similar to a query image by using a patch unit feature value acquired by collecting a local feature value in a patch and an object region unit feature value acquired by collecting a local feature value in an object region. Specifically, the image processing apparatus 10 can roughly narrow down reference images by using an object region unit feature value, and then search, by using a patch unit feature value, for a desired reference image from among the reference images being roughly narrowed down.

Such an image processing apparatus 10 can narrow down the number of reference images on which comparison processing between patch unit feature values is performed. As a result, a processing load on a computer is reduced, and a search speed becomes faster.

While the example embodiments of the present invention have been described with reference to the drawings, the example embodiments are only exemplification of the present invention, and various configurations other than the above-described example embodiments can also be employed. The configurations of the example embodiments described above may be combined together, or a part of the configuration may be replaced with another configuration. Further, various modifications may be made in the configurations of the example embodiments described above without departing from the scope of the present invention. Further, the configurations and the processing disclosed in each of the example embodiments and the modification examples described above may be combined together.

Further, the plurality of steps (pieces of processing) are described in order in the plurality of flowcharts used in the above-described description, but an execution order of steps performed in each of the example embodiments is not limited to the described order. In each of the example embodiments, an order of illustrated steps may be changed within an extent that there is no harm in context. Further, each of the example embodiments described above can be combined within an extent that a content is not inconsistent.

Apart or the whole of the above-described example embodiments may also be described in supplementary notes below, which is not limited thereto.

1. An image processing apparatus including:
    an image processing unit that detects an object region occupied by an object in an image;
    a patch size decision unit that decides a patch size, based on a size of the object region;
    a patch unit feature value-computation unit that sets a plurality of patches having the patch size in the object region, and computes a patch unit feature value acquired by collecting a local feature value in a patch for each patch; and
    a search unit that searches for an image similar to a query image from among a plurality of reference images by using the patch unit feature value.

2. The image processing apparatus according to supplementary note 1, wherein
    the patch size decision unit decides the patch size, based on a proportion of a size of the object region to a size of an entire image.

3. The image processing apparatus according to supplementary note 2, wherein
    the patch size decision unit decides, as the patch size, a product of a predetermined reference value and the proportion.

4. The image processing apparatus according to any of supplementary notes 1 to 3, wherein,
    when a plurality of objects are present in an image, the image processing unit detects the object region for each object,
    when a plurality of the object regions are detected from an image, the patch size decision unit decides the patch size according to a size of each of the object regions for each of the object regions, and, when a plurality of the object regions are detected from an image, the patch unit feature value-computation unit sets a plurality of patches having the patch size decided in association with each of the object regions in each of the object regions, and computes the patch unit feature value acquired by collecting a local feature value in a patch for each patch.

5. The image processing apparatus according to any of supplementary notes 1 to 4, further including
an object region unit feature value-computation unit that computes an object region unit feature value acquired by collecting a local feature value in the object region, wherein
the search unit searches for an image similar to the query image by using the patch unit feature value and the object region unit feature value.

6. The image processing apparatus according to supplementary note 5, wherein
the search unit
searches, from among the reference images, for an image including an object whose degree of similarity to an object included in the query image being computed based on the object region unit feature value is equal to or more than a first reference value, and
then searches, from among the searched reference images, for an image including an object whose degree of similarity to an object included in the query image being computed based on the patch unit feature value is equal to or more than a second reference value.

7. The image processing apparatus according to any of supplementary notes 1 to 6, wherein
the search unit searches, from among a plurality of the reference images, for an image similar to the query image, based on a degree of similarity between the patch unit feature value of the query image and the patch unit feature value of the reference image,
the patch size used for computing the patch unit feature value of the query image is decided according to a size of the object region in the query image, and
the patch size used for computing the patch unit feature value of the reference image is decided according to a size of the object region in the reference image.

8. The image processing apparatus according to supplementary note 7, wherein,
when a size of the object region in the query image and a size of the object region in the reference image are different from each other, the patch size used for computing the patch unit feature value of the query image and the patch size used for computing the patch unit feature value of the reference image are different from each other.

9. An image processing method including,
by a computer:
detecting an object region occupied by an object in an image;
deciding a patch size, based on a size of the object region;
setting a plurality of patches having the patch size in the object region, and computing a patch unit feature value acquired by collecting a local feature value in a patch for each patch; and
searching for an image similar to a query image from among a plurality of reference images by using the patch unit feature value.

10. A program causing a computer to function as:
an image processing unit that detects an object region occupied by an object in an image;
a patch size decision unit that decides a patch size, based on a size of the object region;
a patch unit feature value-computation unit that sets a plurality of patches having the patch size in the object region, and computes a patch unit feature value acquired by collecting a local feature value in a patch for each patch; and
a search unit that searches for an image similar to a query image from among a plurality of reference images by using the patch unit feature value.

10 Image processing apparatus
11 Image processing unit
12 Patch size decision unit
13 Patch unit feature value-computation unit
14 Search unit
15 Object region unit feature value-computation unit
1A Processor
2A Memory
3A Input/output I/F
4A Peripheral circuit
5A Bus

The invention claimed is:
1. An image processing apparatus comprising:
at least one memory storing one or more instructions; and
at least one processor configured to execute the one or more instructions to:
for a query image:
detect an object region occupied by an object in the query image;
determine, for the query image, a patch size of a plurality of patches to be set inside the object region in the query image, based on a size of the object region in the query image and a proportion of a size of the object region in the query image to an overall size of the query image,
wherein the patch size is determined as a product of a predetermined reference value and the proportion, is determined to enclose a part of the object region, and is smaller than the size of the object region;
set the plurality of patches having the patch size in the object region in the query image;
compute for each patch a patch unit feature value acquired by collecting a local feature value in the each patch in the object region in the query image;
compute an object region unit feature value acquired by collecting a local feature value in the object region in the query image;
for each of a plurality of reference images:
detect an object region occupied by an object in the reference image:
determine, for the reference image, a patch size of a plurality of patches to be set inside the object region in the reference image, based on a size of the object region in the reference image and a proportion of a size of the object region in the reference image to an overall size of the reference image,
wherein the patch size is determined as a product of the predetermined reference value and the proportion, is determined to enclose a part of the object region, and is smaller than the size of the object region;
set the plurality of patches having the patch size in the object region in the reference image:

compute for each patch a patch unit feature value acquired by collecting a local feature value in the each patch in the object region in the reference image;

compute an object region unit feature value acquired by collecting a local feature value in the object region in the reference image;

search for target images similar to a query image from among the plurality of reference images by using the patch unit feature value and the object region unit feature value, by:

searching, from among the reference images, for preliminary images including an object having a first degree of similarity to an object included in the query image equal to or more than a first reference value, the first degree of similarity computed based on the object region unit feature value; and searching, from among the second images, for the target images including an object having a second degree of similarity to the object included in the query image equal to or more than a second reference value, the second degree of similarity computed based on the patch unit feature value, wherein the size of the object region in the query image and the size of the object region in each reference image are different from each other, and the patch size used for computing the patch unit feature value of the query image and the patch size used for computing the patch unit feature value of each reference image are different from each other.

2. The image processing apparatus according to claim 1, wherein, the processor is further configured to execute the one or more instructions to:

when a plurality of objects are present in the image, detect the object region for each object;

when a plurality of object regions are detected in the image, decide the patch size for each object region according to a size of the each object region; and when the plurality of object regions are detected in the image, set the plurality of patches having the patch size decided for each object region, and compute for each patch set for each object region the patch unit feature value acquired by collecting a local feature value in the each patch.

3. An image processing method performed by a computer and comprising:

for a query image:

detecting an object region occupied by an object in the query image;

determining, for the query image, a patch size of a plurality of patches to be set inside the object region in the query image, based on a size of the object region in the query image and a proportion of a size of the object region in the query image to an overall size of the query image, wherein the patch size is determined as a product of a predetermined reference value and the proportion, is determined to enclose a part of the object region, and is smaller than the size of the object region;

setting the plurality of patches having the patch size in the object region in the query image;

computing for each patch a patch unit feature value acquired by collecting a local feature value in the each patch in the object region in the query image;

computing an object region unit feature value acquired by collecting a local feature value in the object region in the query image;

for each of a plurality of reference images:

detecting an object region occupied by an object in the reference image;

determining, for the reference image, a patch size of a plurality of patches to be set inside the object region in the reference image, based on a size of the object region in the reference image and a proportion of a size of the object region in the reference image to an overall size of the reference image, wherein the patch size is determined as a product of the predetermined reference value and the proportion, is determined to enclose a part of the object region, and is smaller than the size of the object region;

setting the plurality of patches having the patch size in the object region in the reference image;

computing for each patch a patch unit feature value acquired by collecting a local feature value in the each patch in the object region in the reference image;

computing an object region unit feature value acquired by collecting a local feature value in the object region in the reference image;

searching for target images similar to a query image from among the plurality of reference images by using the patch unit feature value and the object region unit feature value, by:

searching, from among the reference images, for preliminary images including an object having a first degree of similarity to an object included in the query image equal to or more than a first reference value, the first degree of similarity computed based on the object region unit feature value; and searching, from among the second images, for the target images including an object having a second degree of similarity to the object included in the query image equal to or more than a second reference value, the second degree of similarity computed based on the patch unit feature value, wherein the size of the object region in the query image and the size of the object region in each reference image are different from each other, and the patch size used for computing the patch unit feature value of the query image and the patch size used for computing the patch unit feature value of each reference image are different from each other.

4. A non-transitory storage medium storing a program causing a computer to:

for a query image:

detect an object region occupied by an object in the query image;

determine, for the query image, a patch size of a plurality of patches to be set inside the object region in the query image, based on a size of the object region in the query image and a proportion of a size of the object region in the query image to an overall size of the query image, wherein the patch size is determined as a product of a predetermined reference value and the proportion, is determined to enclose a part of the object region, and is smaller than the size of the object region;

set the plurality of patches having the patch size in the object region in the query image;

compute for each patch a patch unit feature value acquired by collecting a local feature value in the each patch in the object region in the query image;

compute an object region unit feature value acquired by collecting a local feature value in the object region in the query image;

for each of a plurality of reference images:

detect an object region occupied by an object in the reference image;

determine, for the reference image, a patch size of a plurality of patches to be set inside the object region in the reference image, based on a size of the object region in the reference image and a proportion of a size of the object region in the reference image to an overall size of the reference image, wherein the patch size is determined as a product of the predetermined reference value and the proportion, is determined to enclose a part of the object region, and is smaller than the size of the object region:

set the plurality of patches having the patch size in the object region in the reference image:

compute for each patch a patch unit feature value acquired by collecting a local feature value in the each patch in the object region in the reference image:

compute an object region unit feature value acquired by collecting a local feature value in the object region in the reference image;

search for target images similar to a query image from among the plurality of reference images by using the patch unit feature value and the object region unit feature value, by:

searching, from among the reference images, for preliminary images including an object having a first degree of similarity to an object included in the query image equal to or more than a first reference value, the first degree of similarity computed based on the object region unit feature value; and searching, from among the second images, for the target images including an object having a second degree of similarity to the object included in the query image equal to or more than a second reference value, the second degree of similarity computed based on the patch unit feature value, wherein the size of the object region in the query image and the size of the object region in each reference image are different from each other, and the patch size used for computing the patch unit feature value of the query image and the patch size used for computing the patch unit feature value of each reference image are different from each other.

* * * * *